United States Patent [19]

Wilson

[11] 4,237,519
[45] Dec. 2, 1980

[54] CAPACITOR WITH A CASE SEAL

[75] Inventor: Samuel R. Wilson, Glens Falls, N.Y.

[73] Assignee: General Electric Company, Hudson Falls, N.Y.

[21] Appl. No.: 65,696

[22] Filed: Aug. 10, 1979

[51] Int. Cl.³ ............................................. H01G 4/04
[52] U.S. Cl. .................................. 361/327; 251/100; 251/339; 361/314
[58] Field of Search ................ 361/314, 327; 137/522, 137/523; 251/291, 100, 296, 339

[56] References Cited

U.S. PATENT DOCUMENTS

| 1,626,684 | 3/1927 | Marbury | 361/314 |
| 2,945,703 | 7/1960 | Ballard | 251/100 X |
| 3,918,474 | 11/1975 | Supancic | 251/339 |

FOREIGN PATENT DOCUMENTS 2347569  10/1972  Fed. Rep. of Germany .......... 361/314

Primary Examiner—E. A. Goldberg
Attorney, Agent, or Firm—J. J. Lichiello

[57] ABSTRACT

An electrical capacitor casing has a fluid filling hole sealed with a self sealing device. The sealing device includes a seat for the seal on the inside of the casing and adjacent of the opening, a resilient gasket, a biasing spring and a retaining housing to form an enclosure for the gasket and spring. A key is used to open the sealing device for drying and filling the case.

4 Claims, 5 Drawing Figures

U.S. Patent    Dec. 2, 1980    4,237,519
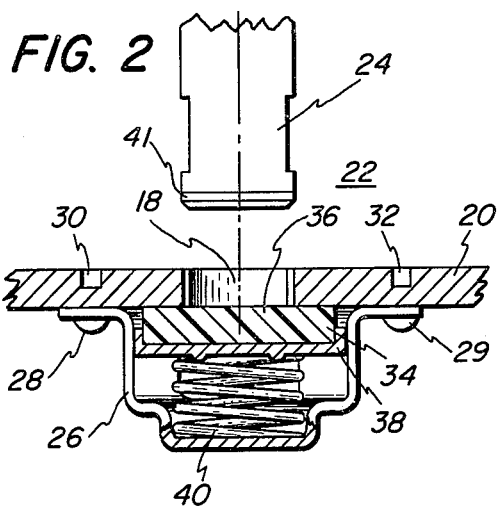
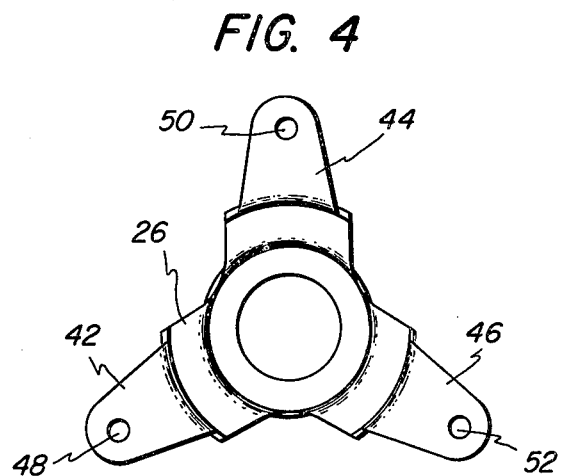
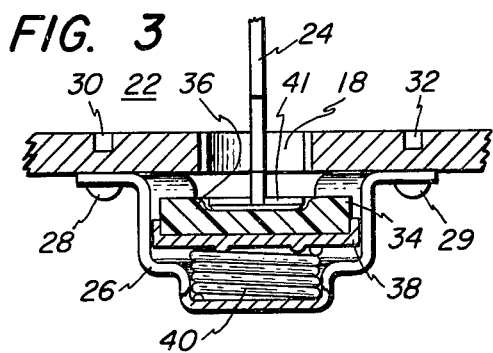
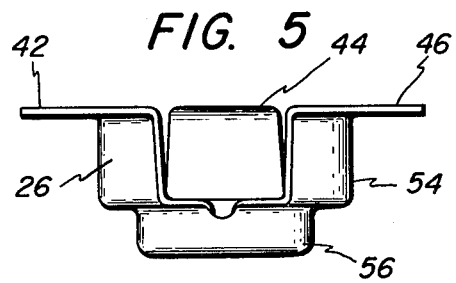
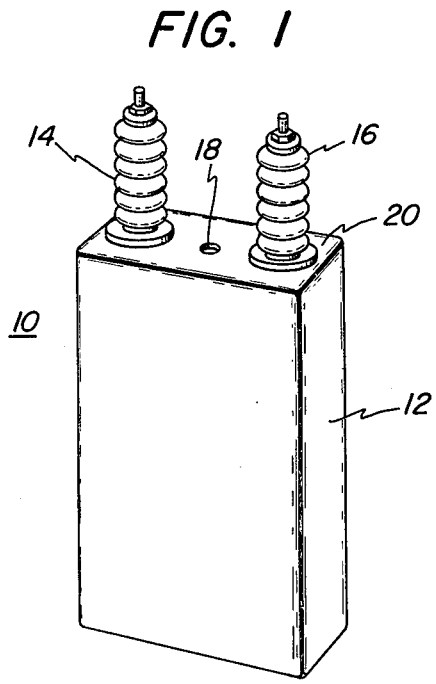

CAPACITOR WITH A CASE SEAL

BACKGROUND OF THE INVENTION

A large liquid impregnated electrical capacitor comprises a casing which may have a volume of one or more cubic feet and contains a number of capacitor roll sections submerged in an impregnant dielectric liquid. Ordinarily the impregnant liquid in the sealed capacitor may be introduced under a pressure of as much as 10 to 15 pounds per square inch. In order to fill the capacitor casing with the liquid impregnant, it has been a common practice to fill each casing individually by filling the casing through a metal fill tube arrangement which at the termination of the filing process is pinched off and sealed by welding or soldering. The final capacitor, therefore, includes an appendange or short tube section projecting from the casing. Such a projection is undesirable for a number of reasons including the fact that it is exposed to mishandling or other injurious conditions which could cause leakage of the impregnant from the capacitor. At the same time, if the capacitor needs to be repaired in such a manner as to require opening of the capacitor, the seal must be broken and the filling process again performed through the fill tube. In many instances, the pinching and sealing or welding arrangement for the fill tube may not be readily available.

An improved device for filling and sealing a capacitor casing is disclosed in U.S. Pat. No. 3,918,474. Supancic, Jr. which includes a fill tube and a threaded plug seal device. The seal means has a short sleeve with fill holes in its walls and a threaded plug seal therein covering the fill holes. The sleeve is permanently mounted in a wall of a casing to project into the casing. A fill tube is threaded into the sleeve and initially engages the plug seal to move the plug further into the sleeve and away from the fill holes while at the same time sealing itself to the casing. After filling the casing through the sleeve and fill holes, the fill tube is threaded out of the sleeve thus moving the plug seal over the fill holes and against a seal in the sleeve before the fill tube itself is unsealed from the casing. An advantage of this device is that it provides a self-sealing and removable fill tube combination which is adapted for reuse. However, a disadvantage is that the plug seal requires special machined parts and the opening or closing of the seal is by means of a threaded plug seal.

Quite surprisingly, I have discovered an improved capacitor filling and sealing device which is self-sealing and is adapted for reuse, but requires no special machining and eliminates the use of a special plug seal.

SUMMARY OF THE INVENTION

In accordance with the present invention, a self-sealing device is positioned inside a casing adjacent a wall opening therein. A fill tube is inserted into the device to fill the capacitor with a dielectric fluid and then, upon retraction of the fill tube, the device automatically forms a fluid tight seal with the casing. The sealing device comprises a seat for the seal, formed on the inside of the opening, a resilient gasket shaped to seal the opening, a biasing spring for urging the gasket into sealing relationship with the seal, and a retaining cage or housing mounted to the inside of the wall or cover to form an enclosure for the gasket and spring, and a guide for aligning the gasket and spring with the seat.

In order to fill the capacitor casing, a fill tube is inserted in the opening. This tube compresses the spring and opens the seal to allow the impregnantion of the capacitor unit. The fill tube is thereafter rapidly removed from the opening permitting the gasket to reseal the unit. For vacuum drying of the capacitor prior to fluid filling a key means is employed to keep the seal open to remove moisture.

BRIEF DESCRIPTION OF THE DRAWING

The invention is more clearly understood from the following description taken in conjunction with the accompanying drawing in which:

FIG. 1 is an illustration of a typical capacitor to which this invention is applied.

FIG. 2 is a cross-sectional view of the sealing device of this invention with a side view of a key means prior to insertion.

FIG. 3 is a cross sectional view of the sealing device of FIG. 2 in the open position and having the key inserted in said device.

FIG. 4 is a bottom view of the retaining cage or housing shown in FIG. 2.

FIG. 5 is a side view of the housing shown in FIG. 4.

DESCRIPTION OF THE PREFERRED EMBODIMENTS

Turning now to the drawing and in particular to FIG. 1, there is shown a power capacitor 10 which is representative of the larger kinds of electrical capacitors. Capacitor 10 comprises a casing 12 which may embrace a volume of one or more cubic feet. Presently, most casings 12 are made of steel and are sealed by welding. At the top of the casing 12 are one or more insulated bushings 14 and 16 through which pass electrical terminals connecting leads to the capacitor rolls within the casing 12. Filling of the casing takes place by means of a fill opening or hole 18 in the cover 20 of capacitor assembly. Sealing of the fill hole 18 has been accomplished by various prior art methods of sealing capacitor fill openings, and include for example, the pinch off tube method as above described. The pinch off tube method is eliminated by the capacitor filling and sealing device of the present invention which is utilized in connection with the fill opening 18 as illustrated.

Referring now to FIG. 2, the sealing device 22 of the present invention is shown in the closed position, and illustrated just above the device 22 is a notched key 24 for maintaining the sealing device 22 in the open position for vacuum drying as will be hereinafter described. The fill opening 18 of the cover 20 is adjacent a retainer cage or housing 26 which is suitably joined to cover 20, for example, by riveting as shown by lugs or rivets 28 and 29. A unique feature of my invention is that these rivets 28 and 29 may be formed as an integral part of the cover 20 by means of extruding some cover material at sites 30 and 32 to form rivet shanks on cover 20. Positioned inside the house 26 is a suitable sealing means such as seal gasket 34 which forms a fluid tight seal against the inside or seat 36 of the fill opening 18. The seal gasket 34, supported by gasket cup washer 38, moves within a predefined portion of the housing 26. Between the housing 26 and the gasket cup washer 38, is a biasing spring 40 that urges the gasket cup washer 38 with the seal gasket 34 set therein toward the seat 36 to provide the fluid tight seal.

In the drying process this seal gasket is held away from the cover 20 by means of the notched key 24 inserted in the opening 18. After drying the key 24 is removed and the gasket 34 seals the unit until it is ready for impregnation. There are small notches on each side of the fill opening 18. Matching ears are present on the fill tube (not shown) which is inserted and given ⅛ to ¼ turn. The fill device seals to the cover with an "O" ring and after impregnation the fill device is released by a reverse ⅛ to ¼ turn. This allows a very quick action of the internal spring loaded seal with a minimum of loss impregnant.

An illustration as shown in FIG. 3 of the sealing device 22 in the open position with the key 24 inserted through the fill opening 18 and suitably rotated to maintain said position. The base 41 of the key 24 presses down on the seal gasket 34 and the gasket cup washer 38 such that the biasing spring 40 is compressed. This opens the sealing device 22. By a simple rotation the notches on the key 24 disengage from the projections in the opening 18 and permit withdrawal of the key 24 which releases the seal gasket 34 and permits the seal to close.

The housing 26 is shown from the bottom view in FIG. 4 and the side view in FIG. 5. In one embodiment of this invention the housing 26 has three mounting legs 42, 44 and 46 with holes 48, 50 and 52 suitably located therein for attaching to the capacitor cover. In FIG. 5 the housing 26 is shown with a first channel 54 for guiding the movement of the seal gasket 34 and the gasket cup washer 38 and a second channel 56 for locating the biasing spring 40.

The novel technique of fastening the housing 26 to an aluminum cover 20 is shown in FIG. 2. Welding or brazing this assembly is neither practical nor economical. The extruded mounting lugs 28 and 29 are used as rivets and allow the mounting of the sealing device 22 to the cover 20 with a single operation of a hammer which strikes the three rivets simultaneously. The method of extruding or cold flowing of the aluminum into a rivet die, at indicated lug sites 30 and 32, assures the leak tightness of the three mounting points.

The sealing device of my invention can be used as a seal for mass spectrometer leak testing of the capacitor, or in other suitable applications where a device needs to be evacuated and fluid filled from the same opening and the opening is required to remain sealed over an operating temperature range of between about −40° C. to 150° C. Under these conditions a capacitor may have both positive and negative pressure therein.

It will be appreciated that the invention is not limited to the specific details shown in the examples and illustrations and that various modifications may be made within the ordinary skill in the art without departng from the spirt and scope of the invention.

What is claimed as new and desired to be secured by Letters Patent of the United States is:

1. In a power capacitor having a casing, a capacitor roll section in said casing, and a cover for said case, said cover having a notched opening therein for filling said capacitor with dielectric fluid, the improvement comprising a sealing means for said opening, said sealing means being comprised of
   (a) a seat for said means formed on the inside of said cover and surrounding said opening,
   (b) a resilient gasket shaped to seal said opening,
   (c) a biasing spring for urging said gasket into sealing relationship with said seat, and
   (d) a housing mounted to the inside of said cover to form an enclosure for said gasket and spring and a guide for aligning said gasket and spring with said seat,
   (e) and key means adapted to fit in and be retained in said notched opening to overcome said biasing spring and to hold said sealing means in unpoled relationship.

2. The capacitor of claim 1, wherein the gasket is supported by a rigid gasket cup washer.

3. The capacitor of claim 1, wherein the housing is formed from aluminum.

4. The capacitor of claim 3, wherein the housing is fastened to rivets on the inside of said cover, and the rivets are formed as an integral part of the cover.

* * * * *